United States Patent [19] [11] 3,774,743
Hendrickson [45] Nov. 27, 1973

[54] CHANGEABLE VERIFICATION CHECK CONTROLLED VENDING

[75] Inventor: William W. Hendrickson, St. Louis City, Mo.

[73] Assignee: UMC Industries, Inc., St. Louis, Mo.

[22] Filed: July 12, 1972

[21] Appl. No.: 271,213

[52] U.S. Cl. ................................................ 194/4 C
[51] Int. Cl. .............................................. G07f 7/02
[58] Field of Search ..................... 194/4, 13, 10, 4 C

[56] References Cited
UNITED STATES PATENTS
3,254,749  6/1966  Scherer ........................... 194/13 X Primary Examiner—Stanley H. Tollberg
Attorney—Irving Powers et al.

[57] ABSTRACT

A vending system and method wherein check-receiver means receives a check having a memory address code and changeable verification code, both of which may be magnetically encoded in stripe format. A code reader reads the codes of a received card. Code-comparing means compares the read verification code with a number stored in a memory at a memory address corresponding to the read address code. If the comparison is correct, a vend means effects a vend operation. A random number generator is operative upon said vending operation to generate a new verification code and corresponding new verification number. Recording means records the new verification code on the check and a means stores the new verification number at said corresponding memory address, changing the previous verification code and number. A retention facility retains the received check upon said vend operation.

12 Claims, 2 Drawing Figures

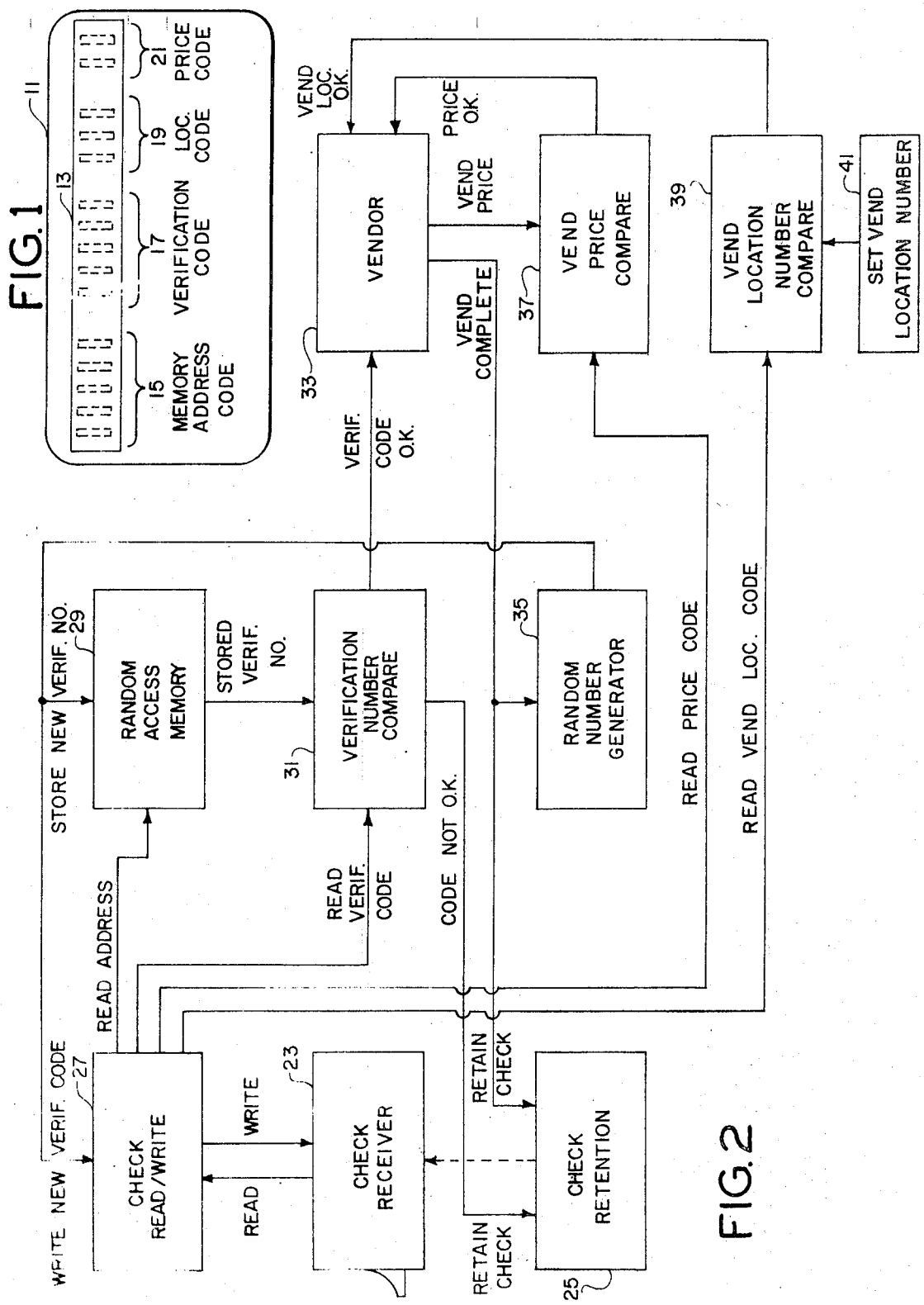

CHANGEABLE VERIFICATION CHECK CONTROLLED VENDING

BACKGROUND OF THE INVENTION

This invention relates to vending and more particularly to check-controlled vending, i.e., vending under the control of a check, such as a credit card, token, or the like.

It has previously been proposed to control vending with conventional embossed or magnetic-stripe credit cards. For example, U.S. Pat. No. 3,184,714 to Brown et al. discloses a system for vending gasoline under the control of a customer's conventionally embossed credit card. Randall U.S. Pat. No. 3,629,834 teaches a system for dispensing money in response to a bank customer's embossed credit card and keyed entry into the vending control apparatus of his personal identification number. The use of a personal credit card having a magnetic stripe carrying a customer's account number in magnetically encoded form is disclosed by Karecki et al. U.S. Pat. No. 3,651,986, wherein a system is described for vending currency and which updates credit information on the credit card before returning it to the customer.

Prior art credit-card-controlled vending systems of the foregoing types all have the characteristic that the credit card or other so-called check is associated with a particular credit account number, i.e., with an individual customer. Such credit cards or checks are thus personalized and are not useful for a merchandizing situation where it is desirable that the check be used by a customer for only one purchase.

A desirable merchandizing method is to sell or otherwise provide checks to customers for a one-time use, each check then becoming a token or medium of exchange in the nature of scrip which any customer holding the check may use with check-controlled vending apparatus in order to be vended whatever check-controlled unit the check entitles him to receive. In this type of system, which may be referred to as a single-use system, the checks are not personalized, i.e., they are like ordinary money having no association with an individual customer.

The term "check" is used in the broad sense of any means adapted to be inserted in a vendor for controlling operation of the vendor, and in the same sense as this term is believed to be used in the title of Class 194 of the U.S. Patent Office's Manual of Classification. The term "vendor" is used in the broad sense of any check-controlled unit for dispensing articles, liquids or services.

Simple tokens or ordinary mediums of exchange have certain disadvantages in single-use check-controlled vending systems of the foregoing type. For example, they may be easily counterfeited, altered, duplicated or stolen, or may be difficult to handle mechanically, or difficult to control as to number or inventory.

SUMMARY OF THE INVENTION

Among the several objects of the invention may be noted the provision of an improved vending system of the check-controlled type and improved methods of vend control; the provision of such a system and methods which are advantageous for single-use check-controlled vending, which simplify merchandizing, and which are substantially immune to counterfeiting, cheating, or the like; the provision of such a system and methods in which checks are employed which if copied without authorization effectively preclude unauthorized vending, and in which checks are easily handled and easily controlled as to number or inventory.

Briefly, a check-controlled vending system comprises means for receiving a check having a memory address code and a verification code, the verification code being adapted to be changed. Means is provided for reading these memory address and verification codes. A random-access memory stores a plurality of verification numbers at corresponding memory addresses thereof and means is included for comparing a verification code read from a received check with a verification number stored in the memory at a memory address corresponding to the memory address code read from the received check. A vend means effects a vend operation if the read verification number compares correctly with the verification number stored at said corresponding memory address. A random number generator serves as means for generating verification codes and verification numbers and is operative upon a vending operation to generate a new verification code different from the verification code read from the received card and a corresponding new verification number. Means is included for recording the new verification code on the received check so as to change the card's verification code to the new one. Similarly, there is provision for storing at said corresponding memory address a new verification number corresponding with the new verification code, thereby changing the verification number at said corresponding memory address. Suitable means retains the received check upon said vend operation.

As a method of vend control, the invention comprises receiving a check having a memory address code and a verification code adapted to be changed, electronically reading the memory address and verification codes, and electronically comparing the verification code with a verification number stored in a random access memory at a memory address corresponding to the memory address code read from the received check. If the read verification code compares correctly with the verification number stored at said corresponding memory address, a vending operation is initiated and a new verification code and a corresponding new verification number are generated. The verification code of the received check is electronically changed by recording the new verification code on the received check. The corresponding next verification number is stored at said corresponding memory address, the received check being retained upon said vend operation. Other objects and features will be in part apparent and in part pointed out hereinafter.

BRIEF DESCRIPTION OF THE DRAWINGS

FIG. 1 is a front elevation of a card-like check employed in the invention and adapted to have encoded information recorded thereon in a magnetic stripe format; and FIG. 2 is a block diagram of the present system.

Corresponding reference characters indicate corresponding parts throughout the several views of the drawings.

DESCRIPTION OF THE PREFERRED EMBODIMENT

Referring now to the drawings, a check for use in a check-controlled vending system of the invention is indicated at 11. While various forms of checks may be employed, as will later be apparent, check 11 is shown as of a card-like configuration similar to conventional credit cards which typically are of thin, resilient synthetic resin material. Check 11 is suitably provided with a magnetic stripe 13 having a magnetic oxide material so that the stripe is machine-readable and machine-recordable. I.e., information may be magnetically "read" (detected) or "written"( recorded) on stripe 13. The information is preferably constituted by characters which are encoded, as in a binary code. A recording density of 75 binary bits per inch may be used, for example.

In accordance with the invention, check 11 carries a memory address code and a changeable verification code, and may also include a vend price code (referred to hereinafter as the price code) and a vend location code. Each of these codes may be constituted by one or more digital characters written on magnetic stripe 13 in binary form. Dashed-line representation is used to schematically illustrate a first group of magnetically recorded binary digits 15 constituting the memory address code, a second group of binary digits 17 constituting the changeable verification code, a third group of binary digits 19 constituting the vend location code, and a fourth group of binary digits 21 constituting the price code.

It is contemplated that checks having the configuration of check 11 will be particularly useful for single-use check-controlled vending. In such single-use vending, a customer may purchase from a merchant one or more such checks. The customer then may use the check 11 for a vend operation, e.g., in conjunction with a vending machine within a store.

In this single-use context, the purposes for the encoded information can be understood as follows: The memory address code defines a number which is unique to the check. I.e., there may be hundreds of such checks of a group, each check having a different address code such as one of the numbers 100–599. The address code corresponds with a memory address within the vending machine as will later be more apparent. The verification code defines a number which can be compared by the vending machine with a corresponding number in the vending machine to determine whether the check holder is entitled to a vend operation. The vend location code may be regarded as a "store" code, i.e., may identify a predetermined store location where a check 11 may be used for a vend operation, or may identify a predetermined vending machine within a store. The price code defines the price of a vend operation. Thus different checks 11 may entitle check holders to respective vend operations of different prices.

During a vend operation, as explained below, the verification code of a check 11 is changed, the other encoded information including the address code, the vend location code, and the price code remaining unchanged. Thus it is to be noted that the latter three codes need not necessarily be magnetically encoded on the magnetic stripe 13 but instead could be provided on the check in other ways, as by embossing, for example.

Referring to FIG. 2, indicated at 23 is a suitable unit for receiving a check 11 upon its insertion into the vending machine for holding the check in a so-called escrow position. In the escrow position the check 11 is inaccessible to the person who has deposited the check. The check remains in the escrow position until completion of a vend operation. Associated with check receiver 23 is a suitable check retention means 25 which operates in certain circumstances explained below to cause the escrowed check to be transferred to a receptacle or the like and thus retained in the vending machine. If not retained following a vending operation, a received check is returned to the depositor.

Also associated with receiver unit 23 is a means indicated at 27 for reading (i.e., detecting) and writing (i.e., recording) encoded information on a received check. Means 27 may be constituted, for example, by a conventional structure having one or more magnetic heads for reading and writing the encoded information on magnetic stripe 13.

Indicated at 29 is a random-access memory (or so-called RAM) for storing in binary coded format a plurality of verification numbers at corresponding memory addresses thereof. Preferably this memory means or RAM 29 is constituted by one or more integrated circuits of a conventionally available type, though it should be apparent that other types of memories might instead be used.

Means designated at 31 is provided for comparing a verification code of a check received by unit 23 with a verification code of a check received by unit 23 with a verification number stored in RAM 29 at a memory address of the RAM corresponding to the memory address code read by unit 27 from the received check. This comparing means 31 may comprise, for example, an integrated circuit binary comparator of a commercially available type.

If the verification code on the received check is "O.K.," i.e., if it compares correctly with the verification number stored at the memory address of RAM 29 corresponding to that read from the received check, then a signal suitably indicating that the verification code is "O.K." is delivered to vend means 33 comprising a suitable mechanism for dispensing goods or services, etc., to the individual who has deposited the check. Thus a vend operation is effected by vendor 33, unless it is prevented in circumstances described shortly.

Upon completion of the vend operation, a suitable "vend complete" signal is delivered by vendor 33 and is received by the check retention unit 25. Thus the check is retained as explained previously. This signal is employed also to cause operation of a conventional random number generator 35 such as will be familiar to those skilled in computer electronics. The function of generator 35 is to generate, in effect, new verification codes and verification numbers. Upon receiving a "vend complete" signal, generator 35 generates a new verification code which is supplied to the check read/write unit 27. Unit 27 records the new verification code on the received check thereby changing its previous verification code to the new code. At the same time, a corresponding new verification number is supplied to RAM 29 for storage in the RAM at the memory address corresponding to the memory address read from the received check. In this way, the verification number at this corresponding memory address is changed.

The foregoing discussion has assumed that the verification code on the received check is "O.K.," i.e., that it compares correctly. If instead it does not compare correctly, that is, it is "not O.K.," no signal is delivered to vendor 33 to cause a vend operation. However, a signal to retain the escrowed check is delivered to retention unit 25 so as to prevent the incorrect, improper or conceivably fraudulent check from being returned to the person who deposited it in the apparatus.

Apparatus of this invention may additionally comprise means for reading a price code on a received check, means for comparing the price code with a vend price, and means for preventing a vend operation if the price code compares incorrectly with the vend price. For this purpose, the check read/write unit 27 may include provision for magnetically decoding magnetic price code characters (as indicated at 21 in FIG. 1) on the received check 11. The read price code is compared by a binary comparator 37 or the like of a conventional type with a vend price signalled by vendor 33. This vend price may, for example, be determined by operation of an item selector by the customer (such as to permit selection of items of different price). A suitable circuit is provided for causing a vend operation to be inhibited unless the price code compares correctly with the price of the selected vend operation. If the vend price and price code compare correctly, a "price O.K." signal or the like from comparator 37 to vendor 33 enables vendor 33 to effect a vend operation as selected.

As an example, a check 11 may entitle its holder to be vended goods having a first price, while vendor 33 may be able to vend goods of either a first or second price. Thus the holder would select with the item selector goods to be vended at the first price. Vending of goods at the second price would be prevented.

The system may also comprise means for reading the vend location code 19 on a received check 11, means for comparing the location code with a predetermined vend location number, and means for inhibiting a vend operation of vendor 33 if the location code compares incorrectly with the vend location number. The location code which is read by read/write unit 27 is provided to a conventional binary comparator 39 or the like.

Comparator 39 effectively compares the read location code with a vend location number which has been set by means 41 such as a thumb wheel switch or the like. Thus means 41 is employed to set into the apparatus a number corresponding to a particular vending machine, a particular merchant identity or store location or corresponding to some other vend "location" attribute. If the location number and location code on a received check 11 compare correctly, a "vend location O.K." signal to vendor 33 permits a vend operation. Otherwise, a vend operation is inhibited.

In its operation, the system involves a method of vend control comprising, first, receiving via receiver 23 a check 11 having at least a memory address code 15 (which, in effect, defines a card identification number) and a verification code 17 adapted to be changed. This first step is initiated, of course, by the check holder who places the check in a slot or the like of the apparatus for the purpose of initiating a vend operation.

Electronic magnetic reading of the binary coded characters defining the memory address and verification codes is carried out by unit 27. Then, unit 31 electronically compares the vend verification code with a verification number stored in RAM 29 at a memory address corresponding to the memory address code 15 read from the received check. A vend operation by vendor 33 is then initiated if the read verification number compares correctly with the stored verification number.

If the vend operation is completed, random number generator 35 is signalled to generate a new verification code and corresponding new verification number. The new number is stored in RAM 29 at the same memory address as the old number, thus changing the verification number at this address. The verification code on the escrowed check is electronically changed by magnetically recording (writing) by unit 27 of the new verification code on the check. The escrowed check is then transferred from its escrow location to a storage location by check retention unit 25. In this way, the received check is retained upon the vend operation.

It may be observed that while a random number generator is presently described as constituting the means for generating new verification codes and numbers, other circuitry might be employed for this purpose and which is consistent with the goal of preventing cheating by using relatively secured and difficultly decipherable verification codes or numbers. It should be noted that a randomly generated verification number or code (rather than one generated in an ordered manner) virtually precludes the possibility of a would-be cheater or counterfeiter "guessing" the correct verification number or code corresponding thereto and using this number on an unauthorized or stolen check.

The present method of a vend control may further comprise, as suggested previously, electronically reading a price code 21 on a received check, electronically comparing by comparator 37 of the read price code with a vend price, and inhibiting a vend operation by vendor 33 if the read price code compares incorrectly with the proper vend price.

Additionally or alternatively, the present method may involve electronically reading a vend location code 19 on a received check 11, electronically comparing by operation of means 39 the read location code with a vend location number, and inhibiting a vend operation of vendor 33 if the read location code and vend location number compare incorrectly.

It is preferred that, in the present method of vend control, the received check be retained if the read verification code 17 in a received check compares incorrectly with the verification number stored at the corresponding memory address of memory 29, even though a vend operation is inhibited. Thus an improper or fraudulent check will not only fail to initiate a vend operation but its further use will be prevented.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A vending system comprising means for receiving a check having a memory address code and a verification code, the verification code being adapted to be changed, means for reading said memory address and verification codes, memory means for storing a plurality of verification numbers at corresponding memory addresses of said memory means, means for comparing a verification code read from a received check with a verification number stored in said memory means at a memory address corresponding to the memory address code read from the received check, vend means for effecting a vend operation if the read verification number compares correctly with the verification number stored at said corresponding memory address, means for generating verification codes and verification numbers and operative upon said vend operation to generate a new verification code different from the verification code read from the received check and a corresponding new verification number, means for recording said new verification code on the received check thereby to change the verification code on the received check to said new verification code, means for storing at said corresponding memory address a new verification number corresponding with said new verification code thereby to change the verification number at said corresponding memory address, and means for retaining the received check upon said vend operation.

2. A vending system as set forth in claim 1 wherein said means for reading codes on a received check and said means for recording codes on the received check are each constituted by means for magnetic reading and writing of magnetically encoded characters on the received check.

3. A vending system as set forth in claim 2 wherein the magnetically encoded characters are in a binary code in a magnetic stripe format on the received check and said memory means is constituted by a random access memory.

4. A vending system as set forth in claim 1 further comprising means for reading a price code on a received check, means for comparing the price code with a vend price, and means for preventing said vend operation if the price code compares incorrectly with the vend price.

5. A vending system as set forth in claim 1 further comprising means for reading a vend location code on a received check, means for comparing the location code with a predetermined vend location number, and means for preventing said vend operation if the location code compares incorrectly with the location number.

6. A vending system as set forth in claim 1 further comprising circuit means for causing the check-retaining means to retain the received check, but preventing said vend operation if the read verification code compares incorrectly with the verification number stored in said memory means at said corresponding memory address.

7. A vending system as set forth in claim 1 wherein said means for generating verification codes is constituted by a random number generator.

8. A method of vend control comprising receiving a check having a memory address code and a verification code adapted to be changed, electronically reading said memory address and verification codes, electronically comparing the verification code with a verification number stored in a memory at a memory address corresponding to the memory address code read from the received check, initiating a vend operation if the read verification code compares correctly with the verification number stored at said corresponding memory address, generating a new verification code and a corresponding new verification number, electronically changing the verification code of the received check by recording said new verification code on the received check, storing said corresponding verification number at said corresponding memory address, and retaining the received check upon said vend operation.

9. A method as set forth in claim 8 wherein said reading and recording of codes on the received check are effected by magnetic reading and writing of binary coded characters.

10. A method as set forth in claim 8 further comprising electronically reading a price code on a received check, electronically comparing the read price code with a vend price, and inhibiting said vend operation if the read price code compares incorrectly with the vend price.

11. A method as set forth in claim 8 further comprising electronically reading a vend location code on a received check, electronically comparing the read vend location code with a predetermined vend location number, and inhibiting said vend operation if the read location code compares incorrectly with the predetermined location number.

12. A method as set forth in claim 8 further comprising retaining the received check but inhibiting said vend operation if the read verification code compares incorrectly with the verification number stored at said corresponding memory address.

* * * * *